United States Patent
Boland

(10) Patent No.: US 9,664,482 B1
(45) Date of Patent: May 30, 2017

(54) MULTIPLE ADVERSARY SUPPRESSION SYSTEM (MASS)

(71) Applicant: John Isaac Boland, Baltimore, MD (US)

(72) Inventor: John Isaac Boland, Baltimore, MD (US)

( * ) Notice: Subject to any disclaimer, the term of this patent is extended or adjusted under 35 U.S.C. 154(b) by 0 days.

(21) Appl. No.: 14/757,010

(22) Filed: Nov. 7, 2015

(51) Int. Cl.
*F41H 13/00* (2006.01)
*G10K 11/178* (2006.01)
*G02B 27/01* (2006.01)

(52) U.S. Cl.
CPC ..... *F41H 13/0043* (2013.01); *F41H 13/0081* (2013.01); *F41H 13/0087* (2013.01); *G02B 27/0172* (2013.01); *G10K 11/178* (2013.01); *G02B 2027/014* (2013.01); *G02B 2027/0138* (2013.01); *G10K 2210/1081* (2013.01)

(58) Field of Classification Search
CPC ............. F41H 13/0081; F41H 13/0087; F41H 13/0043; F41H 13/0056; F41H 13/0075; G02B 27/0172; G02B 2027/0138; G02B 2027/014; G10K 11/178; G10K 2210/1081
USPC ................... 89/1.1, 1.11; 362/202, 259, 103; 367/139; 250/221; 381/106, 303; 706/46; 349/14; 315/76
See application file for complete search history.

(56) References Cited

U.S. PATENT DOCUMENTS

| | | | | |
|---|---|---|---|---|
| 6,237,461 | B1* | 5/2001 | Poole | F41H 9/10 222/1 |
| 6,367,943 | B1* | 4/2002 | Tocci | F41H 5/08 362/103 |
| 7,220,957 | B2* | 5/2007 | Choi | F41H 13/0087 219/121.63 |
| 2006/0256559 | A1* | 11/2006 | Bitar | F41A 33/02 362/259 |
| 2010/0072895 | A1* | 3/2010 | Glynn | F41H 13/0081 315/76 |
| 2011/0235467 | A1* | 9/2011 | Bostick | A01M 29/16 367/139 |
| 2015/0304789 | A1* | 10/2015 | Babayoff | H04R 1/403 381/303 |
| 2015/0347902 | A1* | 12/2015 | Butler, Jr. | G06N 5/022 706/46 |
| 2016/0025305 | A1* | 1/2016 | Maier | G02B 19/0028 362/202 |
| 2016/0062148 | A1* | 3/2016 | Brudz | G02C 7/101 349/14 |
| 2016/0105745 | A1* | 4/2016 | Henry | F41H 13/0081 381/106 |

* cited by examiner

Primary Examiner — John D Cooper

(57) ABSTRACT

The Multiple Adversary Suppression System (MASS) is an integrated, digitally controlled nonlethal weapon system designed to disable unshielded humans and interfere with susceptible materiel. MASS emits photic and audio stimulation at intensities designed to cause distress. MASS shields its users from direct photic and analog audio stimulation, instead processing that data digitally and filtering out the disruptive stimuli MASS emits. The physical components of MASS consist of a computer controlled headset with digital visual and audio processing equipment, and a computer controlled emission rig with high intensity photic and audio emission equipment.

1 Claim, 1 Drawing Sheet

MULTIPLE ADVERSARY SUPPRESSION SYSTEM (MASS)

BACKGROUND

Military and police forces confronting violent civilian populations or military or para-military groups embedded within civilian populations face difficulty in finding appropriate levels of force that minimize civilian injuries and fatalities while protecting the lives of military and police personnel. Objectives such as restoring civil order or suppressing attacks originating within an area populated by non-combatants may be compromised or abandoned if the risk of casualties on both sides appears by some standard prohibitive. As a result, military and police forces have sought to employ non-lethal means of suppression. Military forces may also seek to employ non-lethal means to reduce non-combatant casualties while employing lethal force against an embedded adversary that is heavily armed.

SUMMARY

Multiple Adversary Suppression System (MASS) is an integrated, digitally controlled photic and audio stimulation system that temporarily disables unshielded human as well as susceptible mechanical targets. Users are shielded from all direct (analog) photic data and from high-decibel audio data while receiving digitally recreated information. MASS provides a means of non-lethal suppression suitable for use in crowd control, in suppression of civil disorder, and in certain military operations. It temporarily blinds, deafens, disorients and disables targets while causing no permanent injury to persons and it protects MASS users from the disabling effects of the photic and audio stimulation. The system also will disable targets' use of image-enhancement (night-vision) equipment.

PRIOR ART

The following is a tabulation of some prior art that appears relevant:

| US patents | | | |
|---|---|---|---|
| Pat. No. | Kind Code | Issue Date | Patentee |
| 8,721,105 | B2 | 2014 May 13 | Eisenberg |
| 7,866,082 | B2 | 2011 Jan. 11 | Eisenberg |
| 7,497,586 | B2 | 2009 Mar. 3 | Eisenberg |
| 7,220,957 | B2 | 2007 May 22 | Choi |
| 6,767,108 | B1 | 2004 Jul. 27 | Blachowski |
| 6,367,943 | B1 | 2002 Apr. 9 | Tocci |
| 6,297,749 | B1 | 2001 Oct. 2 | Smith |
| 5,756,989 | A | 1998 May 26 | Bear |
| 5,113,177 | A | 1992 May 12 | Cohen |
| 5,081,542 | A | 1992 Jan. 14 | Efron |
| 5,072,342 | A | 1991 Dec. 10 | Minovich |
| 5,296,854 | A | 1994 Mar. 22 | Hamilton |
| 3,565,069 | A | 1971 Feb. 23 | Miller |

| U.S. patent application Publications | | | |
|---|---|---|---|
| Publication Nr. | Kind Code | Publication Date | Applicant |
| 20060284791 | A1 | 2006 Dec. 21 | Chen |
| 20020191003 | A1 | 2002 Dec. 19 | Hobgood |

Nonpatent Literature Documents

Tech Times, "Google Cardboard Now Available in 100 Countries" (Oct. 14, 2015)
Risen, Tom, *U.S. News & World Report*, "Samsung, Oculus Make Virtual Reality Affordable" (Sep. 24, 2015)
Kaufman, Michael, *GeekDad*, "Augmented Reality Making Everyone the Expert" (Oct. 23, 2015)
Pasternak, Alex, *Motherboard*, "The New Sound of Crowd Control" (Dec. 17, 2014)

Systems created under prior art have encountered two related problems. 1. Light and sound stimulation must be intense enough to disorient and disable a targeted person but not so intense as to cause permanent injury. 2. Users of the systems must be protected from the effects of their own devices.

Narrowly targeted light (laser) solves the second problem, but it risks permanent injury to the targets and is illegal under certain international protocols. Use against civilian or military targets is therefore unfeasible. Broadly disseminated light can be projected at sufficient intensity to disorient and disable targets, but the light affects users as well as targets. Systems designed to protect users from the intense light have relied on equipment including goggles employing mechanical "shutter"-like devices that are timed to close against light bursts. Because the systems rely on mechanical timing devices, any failure to maintain the devices' calibration risks exposing users to disabling photic (light) data.

Photic stimulation is the application of radiant energy to an organism or electronic receiver or sensor at a frequency and intensity to which the organism or electronic device will respond. Audio stimulation is the application of variations in a medium such as air created by vibrations at such a frequency as to stimulate an organism's audio sensory system or a synthetic analog (such as an electronic microphone) to respond.

Photic stimulation varies in its effect depending on wavelength, intensity, duration and manner of application. "High-intensity" photic stimulation interrupts the brain's ability to process information and organize activity. Immediate effects include temporary vision impairment, confusion, distress, disorientation, fear and nausea. These effects disable a targeted person's ability to resist an attack or to mount or continue an attack. At certain levels "high-intensity" photic stimulation may cause psychological or physical harm.

"High-intensity" in this context has an established meaning in the art both as to level of stimulation and as to light intensity.

Audio stimulation varies in its intensity, wavelength and duration. High-intensity audio stimulation may cause distress, disorientation, fear, pain, or psychological or physical harm to targeted persons. Like "high-intensity" photic stimulation, "high-intensity" audio stimulation has been shown to disrupt the brain's ability to process information and organize activity, rendering target individuals incapable or less capable of resisting attack, launching counterattack or communicating.

A recognized application of high-intensity photic and audio stimulation having an incapacitating effect is the "flash-bang" grenades used by police and military forces. Grenades have the shortcoming of being "one-time-use" devices.

The Convention On Prohibitions Or Restrictions On The Use Of Certain Conventional Weapons Which May Be Deemed To Be Excessively Injurious Or To Have Indiscriminate Effects (1980), particularly Protocol I V, Protocol Relating to Blinding Laser Weapons (1995), (International Committee of the Red Cross, Geneva, Switzerland), prohibits the use of laser weapons causing blindness to the naked eye or eye with corrective lenses.

A number of prior systems exist for the purpose of disabling of target subjects with flashing light. None, however, employs currently available technology for the digital reprocessing of environmental data as part of a system protecting the user from the effects of the photic stimulation.

The United States Army's Active Denial System (ADS) is a directed energy weapon intended to be nonlethal. It fires a beam of 95 GHz at a target, exciting water and fat molecules in the subject's skin like a microwave oven. This particular frequency only penetrates a fraction of an inch into the skin of the target, limiting the heating effects to the very top layer, and hopefully avoiding any internal damage. Like MASS, ADS is designed to non-lethally suppress a crowd of enemies using light. Unlike MASS, ADS can only be operated in short bursts as second-degree burns have been observed in overexposed test subjects. Outside of controlled conditions, such as on a battlefield or during a riot, it is reasonable to believe that ADS would have increased potential to cause lasting harm in the form of significant burns. ADS also causes pain, rather than disorienting and confusing the target. Waves at 95 GHz may be stopped by particularly thick clothing, such as usual combat uniforms or a heavy jacket. ADS targets the entire body for burning pain, while MASS only targets the eyes and ears for temporary blindness and impairment of hearing. ADS also effects all individuals in its field of operation, while MASS users can be protected completely from the light and substantially from the sound. As ADS is a coherent beam, it also has the potential to be reflected back at the user by an ingenious subject wielding a mirrored surface.

U.S. Pat. No. 7,220,957 B2 discloses a method and system to provide high-intensity photic stimulation by trigger signals in commanded patterns of duration and frequency. A user views a field illuminated through a shutter viewer such as shutter goggles. The goggles are gated to a light blocking state in response to trigger pulses. The light blocking state has a wider time width than the light flashes. Nonetheless, the system requires synchronization of light pulses and the opacity of the shutter goggles. Because the goggles deliver visual data directly to the user in analog form, any failure of synchronization produces system failure exposing the user to high-intensity photic stimulation. This system has no audio stimulation/protection component.

U.S. Pat. No. 6,367,943 B1 discloses a shield combined with light sources which produce light pulses. The light pulses are directed to disable a target subject whom the user of the shield wishes to capture or control. The light sources comprise lasers or light emitting diodes (LEDs). These sources have particular frequencies of light emission. The patent points out that if the target subjects are aware of the value of the frequency used in standard equipment, they can employ laser goggles to block the light pulses. In one form, light sources of two different frequencies are utilized, since two frequencies cannot easily be blocked by wearing laser goggles. Providing for two different wavelengths of light increases cost and complexity of the system. Additionally, the laser embodiments of this system are subject to the drawbacks of laser systems as described above. And further, the shield must be directed only against the target, rendering it impractical in a disordered environment.

An alternative to laser goggles is seen in U.S. Pat. No. 5,756,989 A, which discloses color night vision goggles using an image intensifier to amplify input radiant energy from a low-luminance field of view. A "bright source detector" is used to detect incoming radiation from a laser jamming system. Output pulses gate the image intensifier to disable the image intensifier in synchronism with laser jamming pulses. The system is independent of the jamming signal. It cannot be synchronized with the jamming signal, but must operate in response to receipt of the jamming signal.

U.S. Pat. No. 5,081,542 A discloses an eye protection device including a liquid crystal light valve which provides a user an image of a scene. The light valve comprises a mechanism for absorbing energy from a laser threat directed at the user. However, the light valve cannot simply turn substantially opaque to block incoming radiation.

U.S. Pat. No. 6,767,108 B1 discloses a flash grenade comprising a layer of flash lamps mounted in a cylindrical housing. Light flashes are intended to disable hostages or non-combatants as well as perpetrators. A trigger circuit for the flash lamps is included in the grenade. There is no opportunity to remotely control the ignition of the flash lamps.

U.S. Pat. No. 5,072,342 A discloses a hand-held pulsed light focused by a reflector and mounted in a simulated gun. A user points the gun at an assailant's head for the purpose of causing temporary blindness. This apparatus has a limited field of illumination, and is not suited for a user facing a number of assailants.

The above-described prior art systems do not place emphasis on protecting the user who is employing the system from the effects of high-intensity flashing illumination or, when protection is attempted, nonetheless expose the user to analog data (directly observed light) that leaves open the possibility that the user may be disabled as well as the target. Nor do the prior art systems incorporate an audio projection/protection component.

While military research has identified "high-intensity ultrasound" as causing lung, intestinal and cardio damage, a long-range acoustic device (LRAD) has been employed successfully against sea pirates and used by police departments. The system covered by the MASS patent application employs lower megahertz ranges intended to disorient suitable for use in non-lethal systems.

MASS uniquely integrates photic and audio stimulation with user protection.

DESCRIPTION

Multiple Adversary Suppression System (MASS) is illustrated in the Figures below. The system has two main components: a Projector component and a Shield component.

The Projector component comprises:
1. A MASS Visual Suppressant Component, referred to as the "Dazzler"
2. A MASS Auditory Suppressant Component, referred to as the "Screamer"

The Shield component comprises:
1. A MASS Visual Shield, referred to as the "Shades"
2. A MASS Auditory Shield, referred to as "Insulator"

OPERATION

Dazzler and Shades Function:
The Dazzler consists of a device emitting bright light that temporarily blinds, disorients, and disables human targets and causes optic overload to certain devices such as light enhancement (night-vision) equipment. The Dazzler is set to flash on and off rapidly with a set pattern of X. The pattern of X can be varied constantly by the user to combat countermeasures.

The Shades consist of a digital headset that blocks all direct (analog) light data while the headset camera selectively transmits digitized visual information. The camera is set to sample at a certain pattern Y, and display those frames to the user.

Relationship Between Pattern X and Y:

The pattern Y is automatically derived from the pattern X in that the frames sampled by Y (then displayed to the user) fall between the flashes of X. By this relationship, if X and Y are sufficiently rapid, the user is presented with the illusion of clear and constant video, while in reality the user is only seeing the frames that are not illuminated by the Dazzler. This is the unique strength of the Shades component: the user is completely shielded from the light flashes emitted by the Dazzler. The Y pattern of data sampling also shields user's electronic equipment from overload.

Screamer and Insulator Function:

The Screamer consists of high-volume speakers specialized for a high-pitched frequency range. The Screamer emits sounds such as pure tones (such as bangs) or human voices (such as screams). The Screamer prevents targets from hearing and communicating effectively, and disorients them.

The Insulator is a set of headphones that substantially block high-volume sound while enhancing low-volume sound. The Insulator has external microphones that pick up and digitize all sound, filtering out the known frequencies emitted by Screamer. After filtering out of the Screamer, digitally reproduced sound is delivered to the user's ear.

Figure 1:
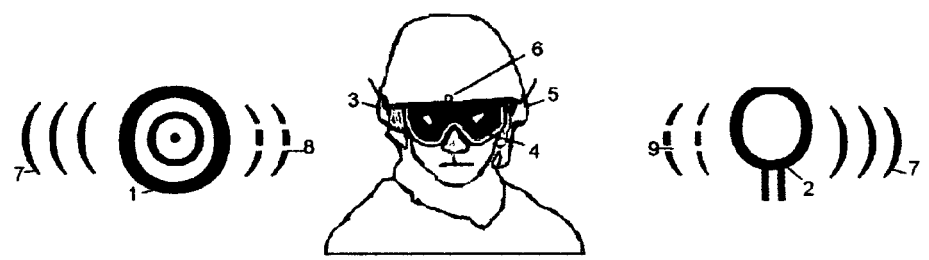
FIG. 1 is a diagram of the basic components of the invention.

The Projector components consist of a high-frequency, high-volume audio projector (Screamer (1)) and a high-intensity light projector (Dazzler (2)). The Shield components consist of headgear incorporating sound-suppressing headphones (Insulators (3)), light-blocking goggles or visor (Shades (4)), audio receiver (5), and camera (6). User(s) activate the Projectors delivering electronically regulated bursts ("pulses") of high-frequency, high-volume audio and high-intensity light (7) against Target individuals or groups. Insulators substantially suppress intense analog sound waves (8) reaching the User while audio receivers enhance lower-volume audio and deliver communications data. Shades block all analog light (9) from reaching the User while the camera samples photic data between the light bursts and displays digitally recreated images inside the goggles or visor. Targets are disoriented and disabled. User receives environmental information stripped of disabling high-intensity audio and photic information.

Activation can occur in various ways including a User switching it on manually or unit leaders or a Central Command triggering the system by radio or similar means. Shield components are worn by the User or Users. Screamer and Dazzler components are deployable in a number of configurations, not limited to mounted on a user, mounted on tripods, mounted on ground or air vehicles. Screamer and Dazzler are shown here separately (to illustrate their separate functions); in practice the functions can be combined in a single device.

Figure 2:
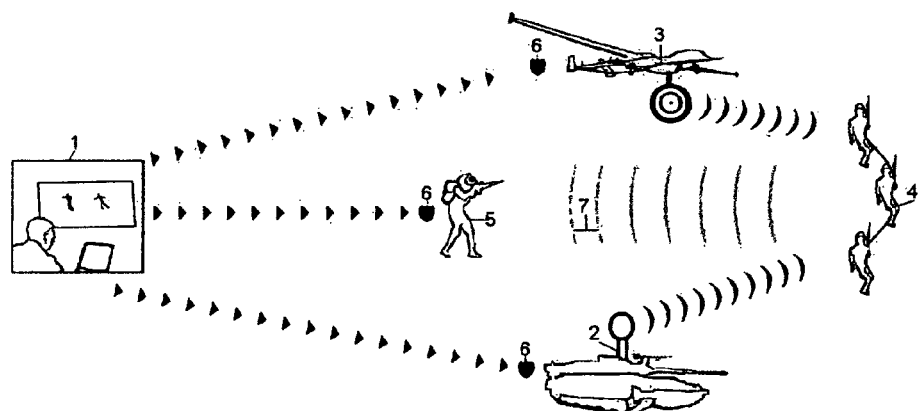

FIG. 2 is a diagram of a system incorporating an embodiment of the invention.

Command Center (1) electronically activates tank-mounted (2) high-intensity light (Dazzler) and aerially (UAV) deployed (3) high-intensity audio component (Screamer) against Targets (4) as User force (5) protected by Shield (6) components (Shades and Insulators) advances. Individual members of the User force, along with the Command Center and tank operators and remote UAV pilots, receive environmental information (7) from which all analog effects of Dazzler have been removed and audio stimulation from the Screamer has been substantially reduced by the Shield component. The Targets are disoriented and disabled by the pulses of high-intensity light and high-volume and high-frequency sound, while the User force remains substantially unaffected.

There are several benefits to this embodiment. Among them: i) It frees individual Users from carrying Dazzlers and Screamers. ii) The vehicle electrical system provides a stronger and more reliable power source than an individual User's battery pack. iii) The embodiment is scalable: single or multiple Dazzlers and Screamers can be deployed against individual Targets or varied-sized Target groups. Dazzler and Screamer are shown here as separate devices but can be combined in a single device.

A similar configuration could employ piloted aircraft such as helicopters. The system could be incorporated into an entirely unmanned embodiment employing remotely controlled air and ground vehicles and mechanical User forces.

TECHNICAL DESCRIPTIONS

MASS projects photic stimulation flashes (pulses) at a high intensity sufficient to induce partial and temporary blindness in a human being but at less than the intensity that may cause permanent damage to the human eye.

MASS projects audio stimulation pulses at frequencies and decibels that induce pain, disorientation and other disabling effects in a human being but at less than the frequency and decibel levels that are likely to cause permanent damage.

The photic Shades component of MASS comprises opaque goggles or visors that admit no analog photic data to the user. A camera picks up "samples" environmental visual data between the photic pulses and produces a visual display for the user inside the goggles or visor. A fail-safe aspect of Shades is that the recreated environmental photic information can be limited in its intensity to protect the user from the effects of light bursts produced by an adversary.

The audio Insulator components of MASS comprises headphones employing passive noise suppression and active noise-cancellation (ANC) and/or sound-activated compression (SAC) to reduce decibels experienced by the user. The same headphones provide microphones collecting low-decibel data and delivering radio communications among individual users and a Central Command.

ADVANTAGES

MASS affords a highly flexible system for control of crowds, police targets or military targets while reducing the likelihood of fatal injuries to the targets, to non-combatants, and to users. It is scalable from single user to multiple users. It can be deployed in circumstances in which the user faces a small number of adversaries or against a larger force. It can be deployed against relatively low-violence resistance or against a military or terrorist group in conjunction with lethal force. The user may employ the light source (Dazzler) alone or in combination with the high-frequency, high-volume audio stimulation source (Screamer). Because the patterns and intensity are set by the user (directly or by a Central Command), they can be varied according to circumstances. The user Shield blocks unwanted photic data from reaching the user and substantially reduces disorienting audio data reaching the user while maintaining the flow of valuable environmental information.

The key improvements that MASS affords over previous systems are:

a) the combination of photic and audio stimulation against adversaries;

b) the digital processing of photic information that reaches the user. This processing is carried out through digital visual sampling and recreation of images and through audio suppression, filtering and enhancement.

c) adaptable technology for stimulation of targets and protection of users is commercially available.

CONCLUSION, RAMIFICATION AND SCOPE

This non-lethal system is suitable for domestic crowd control during civil unrest, for peace-keeping operations in hostile environments, for prisoner control, for refugee control, or in military suppression of hostile populations or forces in which the use of exclusively lethal methods—as when the hostile force is embedded within a civilian population—is undesirable. The non-lethal system is also suitable for use in conjunction with other, including lethal, suppression methods. The system enables a user to narrow its use of lethal methods to actual combatants as they become vulnerable through disabling light and sound.

I claim:

1. A method for projecting high-intensity light stimulation and high-volume, high-frequency audio stimulation that is configured to temporarily blind, deafen, disorient and disable a target person or persons while protecting a user or users of this method from analog light and analog audio stimulation, comprising:

a) using high-intensity light sources flashing at predetermined times, and b) using opaque goggles or visors configured to protect said method's users from all analog light data, and c) using cameras sampling environmental visual data at predetermined times and digitally recreating and displaying said data upon the goggles or visor for the user, and d) using audio speakers projecting high-volume, high-frequency audio stimulation, and e) using headphones to suppress a substantial portion of the analog audio data reaching the user, and f) using microphones to electronically sample and enhance analog audio data and provide communications to the user, whereby intense light and audio stimulations are configured to render the targeted person incapable of resisting an attack by the user of the method and incapable of mounting an attack against said user and said user is shielded from all analog light stimulation and substantial analog audio stimulation while receiving digitally selected and recreated visual and audio information.

* * * * *